United States Patent [19]

Gillespie et al.

[11] 4,210,477
[45] Jul. 1, 1980

[54] TUBE FORMING METHOD

[75] Inventors: William S. Gillespie, Barrington; Hal L. Inglis, Fox River Grove, both of Ill.

[73] Assignee: American Can Company, Greenwich, Conn.

[21] Appl. No.: 921,092

[22] Filed: Jun. 30, 1978

[51] Int. Cl.² .......................................... B29C 19/02
[52] U.S. Cl. .................................. 156/203; 156/272; 156/275; 156/380; 156/466; 219/10.53; 219/8.5
[58] Field of Search ............... 156/203, 466, 272–275, 156/380; 219/10.53, 8.5; 53/DIG. 2, 550–551

[56] References Cited

U.S. PATENT DOCUMENTS

| 3,242,300 | 3/1966 | Osborn | 219/8.5 |
| 3,393,286 | 7/1968 | Zandstra | 219/8.5 |
| 3,511,957 | 5/1970 | Cannon et al. | 219/8.5 |
| 3,575,769 | 4/1971 | Radzio | 156/203 X |

Primary Examiner—David A. Simmons
Attorney, Agent, or Firm—Robert P. Auber; Stuart S. Bowie; Aaron Passman

[57] ABSTRACT

A laminate of non-ferrous metal foil and heat softenable material is folded to tubular form to juxtapose the margins and the margins are heat sealed by passing the tube through an inductance coil; the inductance field may be intensified by a ferrite bar located in a mandrel over which the tube is fed.

3 Claims, 7 Drawing Figures

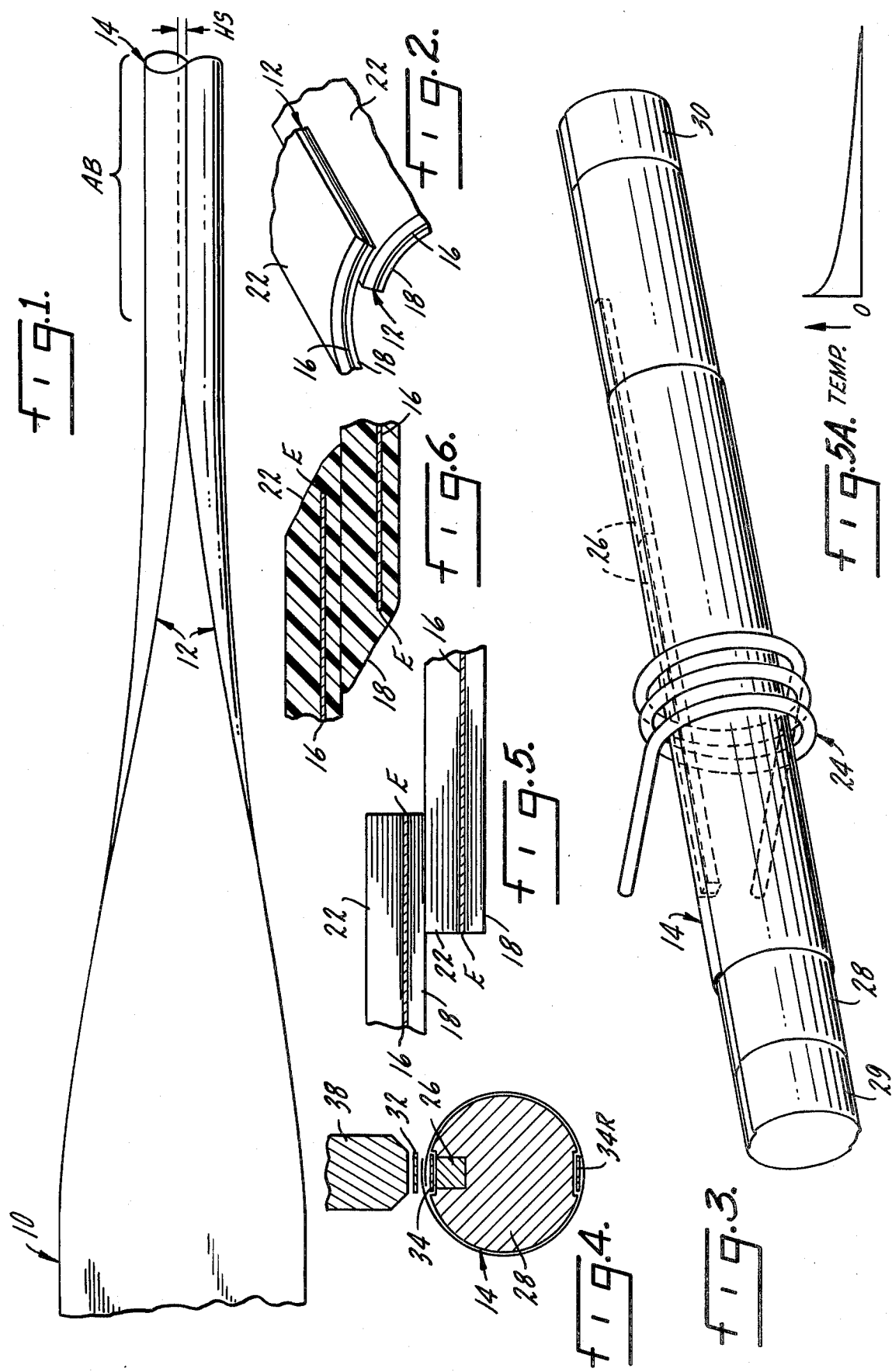

TUBE FORMING METHOD

This invention relates to the production of tubes from a strip of non-ferrous thin metal foil coated on at least one side with a heat softenable material and in which the tubular form is achieved by mating the edges and fusing the heat softenable material. Tubes of this kind are used in packaging, notably toothpaste, and there are many other uses, the packing of condiments, adhesives and so on.

It is known to produce such tubes by gradually bending the strip (continuously fed) to lap the edges while advancing the lapped edges between a pair of shoes each heated by electrical resistance. That process is slow and cumbersome because the equipment involves a considerable heat sink so that a slow feed of the strip is required in order to assure the passage of adequate heat to the interface. Accordingly, one object of the present invention is to eliminate the need for such heat sources and to increase the feed rate of the tube being bonded.

In the instance of mandrels heretofore used, the heated mandrels contact the opposed lap surfaces from the outside and inside diameters, just as if one clamps a pair of sheets between a hot pair of pliers. However, it is the plastic surfaces in contact with one another at the inside of the lap, not those in contact with the hot elements, where fusion and bonding are to occur. As a consequence, in the known practice, a greater amount of heat is applied where it is not needed in order that the needed quantity will flow to the fusion zone. As a result, there may be considerable plastic flow or wrinkling at the outside of the seam adversely affecting cosmetic appearance, and in the instance of small plastic tubes which are to be printed with medicinal instructions considerable room is lost because the printing would be indistinct when applied to the plastic flow areas.

Accordingly, other objects of the present invention are to produce a more efficient (quicker, less width) heat bonded sideseam, to improve the cosmetic appearance of that seam, and to enlarge the area of the tube capable of being printed with letters easy to read. A related object of the present invention is to develop equipment which can be more easily controlled from the standpoint of the width of the fused seam.

The container of the present invention incorporates a non-ferrous metal foil. It may be aluminum or copper or other non-ferrous metal. One purpose of the foil may be to safeguard the contents (e.g. medicine, food, toothpaste) from oxidation or contamination. The edge of the metal should therefore not be in contact with the contained material inside the tube. Another object of the present invention is to assure that for such uses the exposed metal will indeed by covered by or submerged in the plastic.

Other objects of the present invention are to make available tubular bodies having the characteristics specified above including a tubular body having a concentric sleeve of non-ferrous metal wholly submerged in a sleeve of plastic and hence fully encased in plastic including the lapped or butted edges of the foil, presenting many possibilities of utility, particularly in terms of an electrical conductor metal sleeve wholly insulated on the inside and outside diameter.

IN THE DRAWING:

FIG. 1 is a plan view of a strip in the process of being folded into a tube;

FIG. 2 is a fragmentary sectional view of the folded tube on an enlarged scale compared to FIG. 1, showing the lap seam;

FIG. 3 is a perspective view showing a preferred embodiment of the invention;

FIG. 4 is a detail view showing one way in which the lap may be constrained and the tube fed at the time of bonding;

FIG. 5 is a fragmentary detail elevation of the lap seam showing diagrammatically and typically how the fused bond is generated;

FIG. 5A is a graph showing a typical thermal gradient;

FIG. 6 is a detail, fragmentary elevational view showing one form of completed bond.

Referring to the drawing, FIG. 1, an endless strip 10, fed from a roll not shown, is gradually folded to bring the opposed edges 12 into convergent relation, eventually overlapping to form a tube 14. A fragment of the tube is shown in FIG. 2 where the side edges are in overlapped relationship incidental to completing a sideseam.

The material constituting the strip 10 comprises a lamination including a non-ferrous metal foil 16 (e.g. aluminum), FIG. 2, coated on at least one side or seam surface with a heat fusible material such as polyethylene 18 for example. However, for most uses the non-ferrous metal foil 16 is coated with plastic on both surfaces so that there is a second layer of polyethylene plastic 22 on the outside diameter of the tube as well. The extreme outside edges of the strip exhibit bare, uncoated metal.

The opposed side margins 12 of the strip 10 are brought into convergent relation in a known manner, as by means of a folding belt, not shown, since this represents a known procedure.

Referring now to FIG. 3 which shows a preferred embodiment of the invention, the tubular form 14, presenting the lapped edges 12, is passed lengthwise through a radio frequency coil (copper, water cooled) 24 responsible for establishing an induction field resulting in eddy currents within the metal foil producing thermal softening and fusion of the juxtaposed plastic surfaces at the sideseam.

The thermal phenomenon involved is diagrammed in FIGS. 5 and 6. In FIG. 5, the shading is intended to show that the hotest surface is at the foil edge area, diminishing outwardly; FIG. 5A shows a corresponding, typical thermal gradient graph. This means that the heat for melting the plastic is concentrated at the lapped foil surfaces and the plastic material 18-22 confined therebetween. The exposed side edges E of the metal foil are extremely hot, more so than the length of foil inward thereof, so that, as shown in FIG. 6, the plastic, during thermal flow, covers the exposed edges E of the metal foil. This flow, to cover the edges of the metal foil, may be of crucial importance in the instance of a tube ultimately being employed as a container for digestible or ingestible contents such as toothpaste where the contents can be contaminated by exposed metal.

To assure prompt development of a narrow fusion bond, allowing high speed feeding of the tube through the induction coil 24, the preferred embodiment of practice is one wherein the induction field is intensified by a bar 26, FIG. 3, of ferrite or equivalent magnetizable material aligned to the axis of the heat seal. The ferrite bar 26 is preferably captured in a receiving slot presented by a cylindrical non-ferrous mandrel 28 over which the lapped tube is fed by the aforementioned folding belt. A single length of ferrite may be employed or two or more short length bars may be assembled in the receiving slot end-to-end as shown in FIG. 3.

Further to assure a more effective induction field, the supporting mandrel 28 is preferably a non-ferrous, high reluctance material such as copper or a non-metallic. The ends of the mandrel 28 preferably extend outwardly of the ends of the magnetizable ferrite bar 26, as shown in FIG. 3. The mandrel ends are attached to and supported by cylindrical steel stub shafts 29 and 30 which serve, respectively, to guide the tube being folded on to the mandrel and to support the sideseamed tube coming off the mandrel. By extending the ends of the mandrel outwardly as shown in FIG. 3, there is assurance the steel stub shafts will not distort the inductance field.

The tube to be sideseamed is fed and guided lengthwise over mandrel 28 by a pair of opposed, guiding feed bands 32 and 34, FIG. 4, between which is captured the lapped edges of the tube; feed band 34 has a return flight 34R. A fixed clamp or guide shoe 38 is juxtaposed above feed band 32 to assure maintenance of the sideseam overlap, that is, the shoe 38 cooperates with the bands 32 and 34 to assure the sideseam overlap does not spread apart. In fact the preference is to employ the shoe 38 to cause the sideseam to be compressed or ironed by the feed bands 32 and 34 thereby to assure intimate, pressed contact of the opposed heat softened surfaces at the time they bond to one another. The spacing in FIG. 4 is exaggerated for clarity.

The bracket AB, FIG. 1, denotes the general location of the parts shown in FIGS. 3 and 4.

By conducting the process in accordance with the manner described above in connection with FIG. 3, the width of the heat seal, HS, FIG. 1 may be easily controlled for minimum extent. Thus, as noted above, the greater heat effect is on the inside of the seam and not on the outside of the exposed plastic as viewed in FIG. 2. As a consequence, there is minimal wrinkling of the plastic adjacent the heat seal in comparison to the prior practice of completing the seal by means of directly heated mandrels. There is resultantly more external surface available for printing or decoration.

The thickness of the strip may be only about ten to twelve mils (say about 0.254 to 0.304 mm) and a frequency of about four hundred fifty K. C. may be employed in that event. The metal foil need not necessarily be aluminum as long as the foil is non-ferrous. The laminate may include two or more internal foils separated by plastic and a paper sheet may also be present as part of the lamination.

If the foil is ferrous metal (e.g. a stainless steel foil) effective heating does not occur at the lapped margins; rather, the plastic is softened part way around the circumference of the tube exclusive of the very lap where plastic flow and fusing are critical.

The principle of the invention could be applied to a mere butt joint, since plastic flow is pronounced at the exposed edges of the metal, and a re-entrant (fold) seam as well.

Regardless of the thickness of the lap seam the amount of power may be easily adjusted or "tuned" for the best seal. This is particularly important when the equipment is to be applied to a strip of greater or less thickness compared to a previous production run for it is only necessary to apply more or less electric power, representing an instant adjustment without delay which is to be contrasted with the earlier practice of using directly heated mandrels where it was necessary to wait for the mandrels to get hotter or cooler as the case may be.

Therefore, in summary, the present process may be conducted at greater speed because of superior heating efficiency, the product has a better appearance because the heat seal "band" is narrowed, the inductance field may be varied instantly, and the metal foil edges can be submerged in plastic without applying heat more than that required to achieve the bond.

We claim:

1. In the method of continuously folding into tubular form, and then heat sealing, the lapped side margins of an elongated continuous strip of non-ferrous metal foil coated on its opposed lateral surfaces with a heat softenable plastic material capable of bonding to itself when softened, the longitudinal edges of the metal foil being exposed at both lateral extremeties of the strip: feeding the tubular form having lapped side margins in encompassing relation on to a circular mandrel of non-ferrous material, positioning inside the tubular form a bar of magnetizable material aligned on the axis of the heat seal, surrounding the tubular form so fed with an induction coil excited by high frequency current causing the heat softenable material to melt to form the heat seal between the lapped surfaces, and regulating the inductance field to be of sufficient intensity to also assure the plastic melts to cover the exposed foil edges in the area of the heat seal but without melting the plastic on the outside of the seam.

2. A method according to claim 1 including the step of compressing the lap at the time of heat sealing.

3. Apparatus for sideseaming by fusion a tube made from a laminate strip of non-ferrous metal foil and heat softenable material capable of being folded into tubular form and bonding to itself when softened, comprising:
   an elongated substantially circular mandrel of non-ferrous material on to which the laminate is to be fed;
   an inductance coil surrounding the mandrel;
   a bar of magnetizable material inside the coil, said bar being aligned to the axis of the mandrel to intensify the inductance field at the sideseam area and
   guide means extending axially of the mandrel to maintain on the mandrel the folded strip with lapped edges so the sideseam is a lap seam.

* * * * *